(12) United States Patent
Wu et al.

(10) Patent No.: US 11,209,110 B2
(45) Date of Patent: Dec. 28, 2021

(54) ELBOW AND PIPE

(71) Applicants: BEIJING BOE DISPLAY TECHNOLOGY CO., LTD., Beijing (CN); BOE TECHNOLOGY GROUP CO., LTD., Beijing (CN)

(72) Inventors: Xufang Wu, Beijing (CN); Zhenshan Lu, Beijing (CN); Ting Cai, Beijing (CN); Xijiang Zhang, Beijing (CN); Peng Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 336 days.

(21) Appl. No.: 16/338,918

(22) PCT Filed: Mar. 20, 2018

(86) PCT No.: PCT/CN2018/079622
§ 371 (c)(1),
(2) Date: Apr. 2, 2019

(87) PCT Pub. No.: WO2018/228011
PCT Pub. Date: Dec. 20, 2018

(65) Prior Publication Data
US 2020/0049295 A1 Feb. 13, 2020

(30) Foreign Application Priority Data
Jun. 13, 2017 (CN) .......................... 201710445662.3

(51) Int. Cl.
*F16L 43/00* (2006.01)
*F16L 11/15* (2006.01)
(Continued)

(52) U.S. Cl.
CPC ............. *F16L 43/001* (2013.01); *F16L 11/15* (2013.01); *E04D 2013/0833* (2013.01); *F16L 27/12* (2013.01); *F23J 2213/20* (2013.01)

(58) Field of Classification Search
CPC ....... F16L 43/001; F16L 43/00; F16L 43/006; F16L 27/1012; F16L 27/11; F16L 11/15; F16L 41/001; F16L 27/0857
See application file for complete search history.

(56) References Cited

U.S. PATENT DOCUMENTS 2,707,117 A * 4/1955 Fentress ................ F16L 51/027
285/226
4,158,462 A * 6/1979 Coral .................. F16L 27/0857
285/144.1
(Continued)

FOREIGN PATENT DOCUMENTS

CN 2132908 Y 5/1993
CN 2158023 Y 3/1994
(Continued)

OTHER PUBLICATIONS

International Search Report and Written Opinion issued in corresponding application PCT/CN2018/079622, dated May 30, 2018, with English translation.
(Continued)

*Primary Examiner* — Matthew Troutman
*Assistant Examiner* — Alexander T Rufrano
(74) *Attorney, Agent, or Firm* — McDermott Will and Emery LLP

(57) ABSTRACT

An elbow includes an elbow body, and a pipe wall of the elbow body is saw-toothed along an extending direction of the elbow body so that a bending angle of the elbow body is adjustable.

8 Claims, 4 Drawing Sheets

(51) Int. Cl.
*F16L 27/12* (2006.01)
*E04D 13/08* (2006.01)
*F16L 58/18* (2006.01)

(56) References Cited

U.S. PATENT DOCUMENTS

| | | | | |
|---|---|---|---|---|
| 4,790,446 | A | * | 12/1988 | Thiltgen ................ F16L 3/015 138/131 |
| 4,819,970 | A | * | 4/1989 | Umehara ................ F16L 11/15 138/121 |
| 4,860,644 | A | * | 8/1989 | Kohl .................... B08B 15/002 454/65 |
| 5,336,130 | A | * | 8/1994 | Ray ..................... B08B 15/002 454/65 |
| 5,482,089 | A | * | 1/1996 | Weber ................ F01N 13/1816 138/103 |
| 6,142,188 | A | * | 11/2000 | Schaerfl .................. A47L 9/24 138/121 |
| 6,227,578 | B1 | | 5/2001 | Fukui et al. |

FOREIGN PATENT DOCUMENTS

| | | |
|---|---|---|
| CN | 2230006 Y | 6/1996 |
| CN | 2274273 Y | 2/1998 |
| CN | 201281187 Y | 7/2009 |
| CN | 201386873 Y | 1/2010 |
| CN | 201696782 U | 1/2011 |
| CN | 205745814 U | 11/2016 |
| CN | 107061912 A | 8/2017 |
| CN | 107255199 A | 10/2017 |
| EP | 1717380 A1 | 11/2006 |
| JP | H07-027277 A | 1/1995 |
| JP | H11-190486 A | 7/1999 |
| JP | 2004-181503 A | 7/2004 |
| KR | 20-2012-0006694 U | 10/2012 |
| KR | 20120118282 A * | 10/2012 |

OTHER PUBLICATIONS

First Office Action issued in Chinese Application No. 201710445662.3, dated Sep. 4, 2018, with English translation.
Second Office Action issued in Chinese Application No. 201710445662.3, dated Apr. 12, 2019, with English translation.
Refusal Decision issued in Chinese Application No. 201710445662.3, dated Aug. 1, 2019, with English translation.

* cited by examiner

ELBOW AND PIPE

CROSS-REFERENCE OF RELATED APPLICATIONS

This application is a U.S. National Phase entry under 35 U.S.C. § 371 of International Patent Application No. PCT/CN2018/079622, filed on Mar. 20, 2018, which in turn claims priority to Chinese Patent Application No. 201710445662.3, filed with the Chinese Patent Office on Jun. 13, 2017, titled "AN ELBOW", which are incorporated herein by reference in their entirety.

TECHNICAL FIELD

The present disclosure relates to the field of pipe connection technologies, and in particular, to an elbow and a pipe.

BACKGROUND

At present, common elbows in the market generally have a standard bending angle of 30°, 45°, 90°, or 180°. Since bending angles of the elbows in the prior art are not adjustable, if elbows of other bending angles are needed in an engineering project requiring high precision, there would be no other choice but to customize such elbows at the manufacturer. In this case, not only the production cycle is long, but also the production plan cannot adjust to last-minute changes in the requirements of the project.

SUMMARY

In a first aspect, embodiments of the present disclosure provides an elbow, which includes:

an elbow body, a pipe wall of the elbow body being saw-toothed along an extending direction of the elbow body so that a bending angle of the elbow body is adjustable.

Optionally, the elbow further includes two end faces. The end faces are annular and are disposed at two ends of the pipe wall of the elbow body. The end faces are perpendicular to the extending direction of the elbow body. The end faces are to be connected to pipe sections to be connected.

Optionally, the elbow further includes an angle adjusting mechanism disposed between the two end faces, and two ends of the angle adjusting mechanism are respectively connected to the two end faces;

the angle adjusting mechanism is used for adjusting the bending angle of the elbow body.

Optionally, the angle adjusting mechanism includes a bent rod and adjusting assembly(s). Two ends of the bent rod are respectively connected to the two end faces, and at least one end of the bent rod is connected to the end face(s) by the adjusting assembly(s).

Optionally, the two ends of the bent rod are respectively connected to the two end faces by the adjusting assemblies.

Optionally, the adjusting assembly includes a connecting bracket fixed to a corresponding one of the two end faces, and a threaded section and an adjusting nut on the bent rod;

the connecting bracket is provided with a through hole on a surface thereof away from the corresponding one of the two end faces. At least a portion of the threaded section of the bent rod passes through the through hole and is cooperatively coupled with the adjusting nut disposed inside the connecting bracket;

the adjusting nut is movable along a thread on the threaded section, and is thus able to drive the connecting bracket to move on the bent rod.

Optionally, an angle between adjacent saw teeth on the pipe wall of the elbow body is 10°~15°.

Optionally, the bending angle of the elbow body is 75°~105°.

Optionally, the elbow body is made of stainless steel.

Optionally, the elbow body is integrally formed with the end faces.

Optionally, the end faces are provided with a plurality of connecting holes, and the connecting holes are to be connected to fixing holes of the pipe sections to be connected by bolts.

In a second aspect, embodiments of the present disclosure further provide a pipe. The pipe includes two sections of the pipe to be connected, which are connected by the elbow according to the first aspect.

BRIEF DESCRIPTION OF THE DRAWINGS

In order to describe technical solutions in embodiments of the present disclosure more clearly, the accompanying drawings used in the description of embodiments will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

The technical solutions in embodiments of the present disclosure will be described clearly and completely with reference to the accompanying drawings in embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

The present disclosure provides an elbow that enables adjustment of a bending angle of the elbow.

The present disclosure provides an elbow which, as shown in FIGS. 1 to 4, includes an elbow body 11. A pipe wall of the elbow body 11 is saw-toothed along an extending direction of the elbow body 11, so that a bending angle of the elbow body 11 is adjustable.

Figure 3:
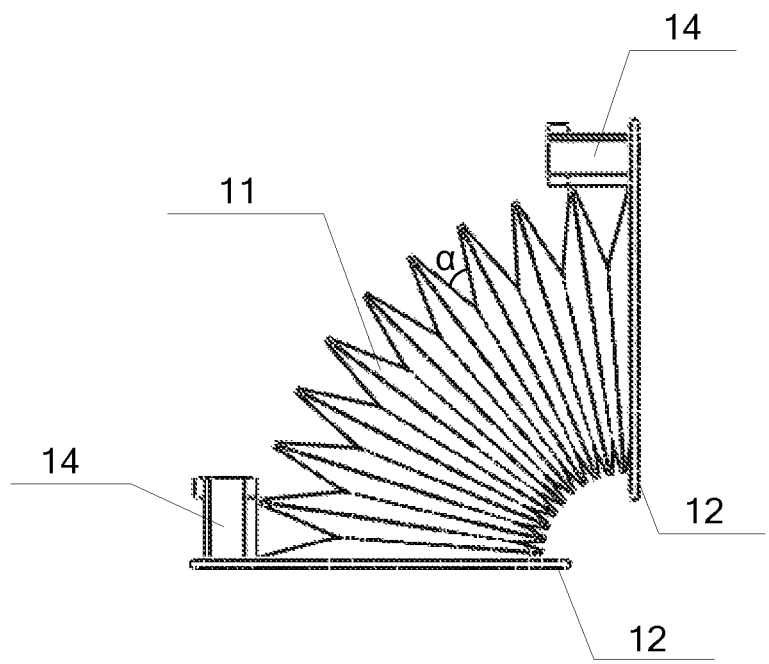
FIG. 3 is a third schematic diagram showing a structure of an elbow according to embodiments of the present disclosure.
Figure 4:
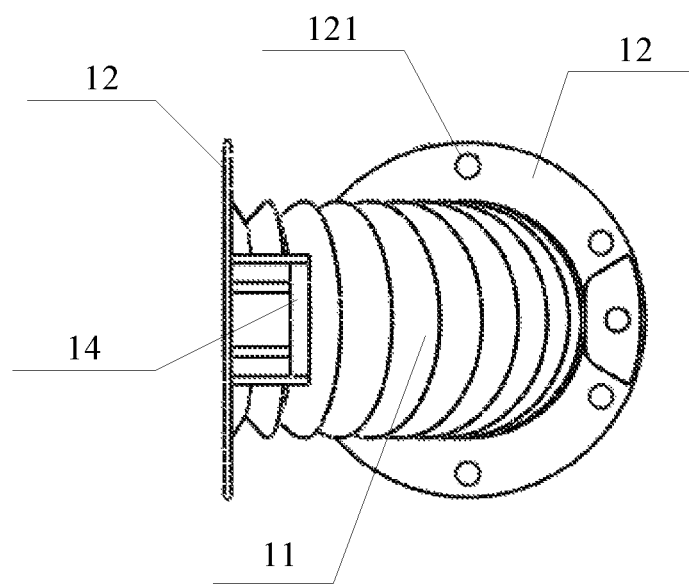
FIG. 4 is a fourth schematic diagram showing a structure of an elbow according to embodiments of the present disclosure.
Figure 5:
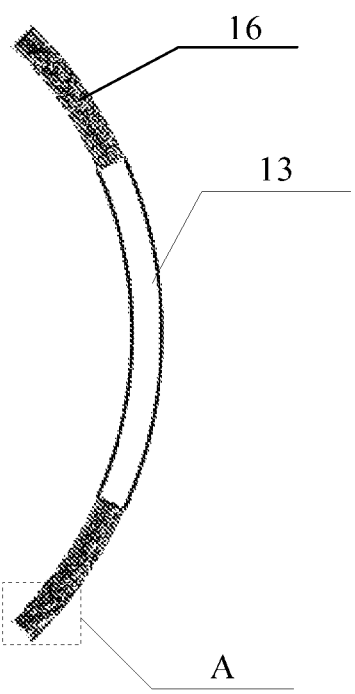
FIG. 5 is a schematic diagram showing a structure of a bent rod according to embodiments of the present disclosure.
Figure 6:
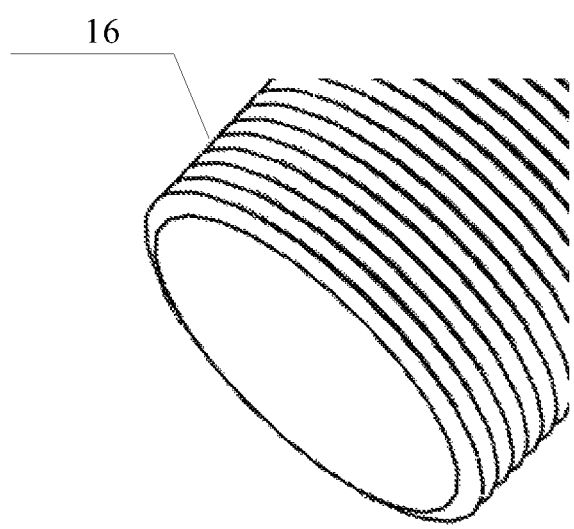
FIG. 6 is an enlarged diagram of area A in FIG. 5.

Embodiments of the present disclosure do not limit an angle between adjacent saw teeth on the pipe wall of the elbow body 11, which can be set by a person skilled in the art according to actual conditions. Referring to FIG. 3, in practical applications, in order to make the elbow body 11 bend better, an angle α between adjacent saw teeth on the pipe wall of the elbow body 11 is generally set to be 10°~15°.

Embodiments of the present disclosure do not limit a number of saw teeth on the elbow body 11 and a material of the elbow body 11. In practical applications, the elbow body 11 is generally made of stainless steel.

Referring to FIGS. 1 to 4, since the elbow body 11 is designed similarly to a structure of an accordion bellows, a shape of the elbow body 11 may be changed, that is, the bending angle of the elbow body 11 may be changed, by applying a force to one or both ends of the elbow body 11.

In this way, compared with the prior art, in embodiments of the present disclosure, the bending angle of the elbow body is made to be adjustable by designing the pipe wall of the elbow body to be saw-toothed along the extending direction of the elbow body. This makes it easy to obtain elbows of various bending angles. Meanwhile, a production cycle of elbows in obtaining different bending angles is shortened, and an application range of elbows is expanded.

Further, two ends of the pipe wall of the elbow body 11 are respectively provided with annular end faces 12. That is, the elbow further includes two end faces 12, and one end face 12 is disposed at one end of the pipe wall of the elbow body 11. The end faces 12 are perpendicular to the extending direction of the elbow body 11, and the end faces 12 are to be connected to pipe sections to be connected 21.

Referring to FIGS. 1 to 4, the end faces 12 are fixedly connected to the elbow body 11, or the end faces 12 are integrally formed with the elbow body 11, which is not limited by embodiments of the present disclosure. In order to make a connection strong and also to facilitate manufacturing, in some embodiments of the present disclosure, the end faces 12 are integrally formed with the elbow body 11.

Figure 2:
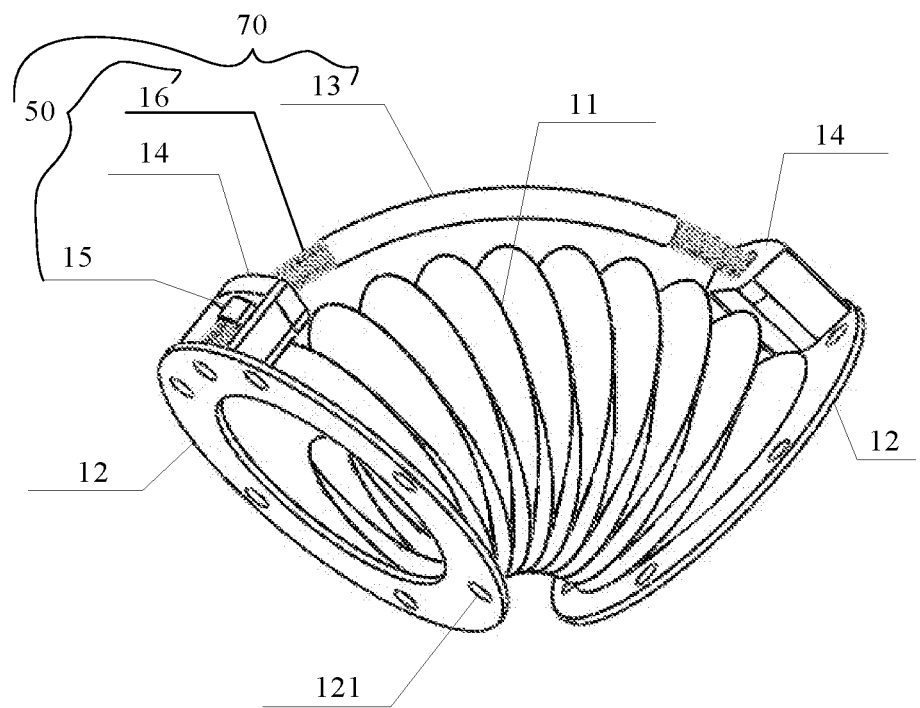
FIG. 2 is a second schematic diagram showing a structure of an elbow according to embodiments of the present disclosure.
Figure 7:
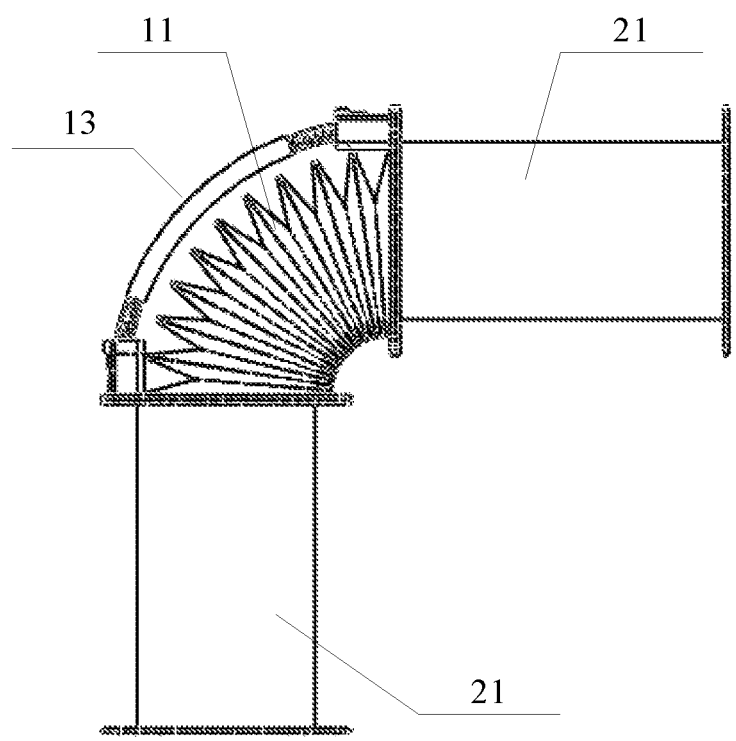
FIG. 7 is a schematic diagram of a portion of a pipe where an elbow is connected to pipe sections to be connected in a pipe according to embodiments of the present disclosure.

In practical applications, referring to FIGS. 2 and 7, the end faces are generally provided with a plurality of connecting holes 121. The connecting holes 121 are to be connected to fixing holes of the pipe sections to be connected 21 by bolts. In this way, a connection of the end faces 12 to the pipe sections to be connected 21 is stronger.

Figure 1:
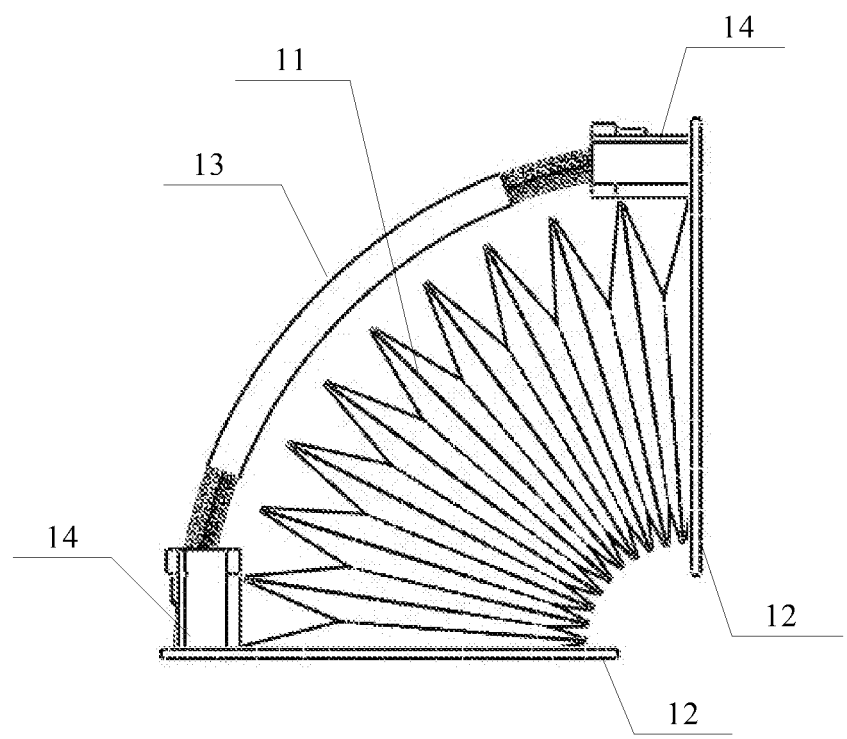
FIG. 1 is a first schematic diagram showing a structure of an elbow according to embodiments of the present disclosure.

Further, referring to FIGS. 1 and 2, the elbow further includes an angle adjusting mechanism 70 disposed between the two end faces 12. Two ends of the angle adjusting mechanism are respectively connected to the two end faces 12. The angle adjusting mechanism 70 is used for adjusting the bending angle of the elbow body 11.

A specific structure of the angle adjusting mechanism 70 may be various, and is not limited by embodiments of the present disclosure. For example, referring to FIGS. 1 to 6, the angle adjusting mechanism 70 includes a bent rod 13 and adjusting assembly(s) 50. Two ends of the bent rod 13 are respectively connected to the two end faces 12, and at least one end of the bent rod 13 is connected to the end face(s) 12 by the adjusting assembly(s) 50. The adjustment assembly 50 includes a connecting bracket 14 fixed to an end face 12, and a threaded section 16 and an adjusting nut 15 on the bent rod 13. The connecting bracket 14 is provided with a through hole on a surface thereof away from the end face 12. At least a portion of the threaded section 16 of the bent rod 13 passes through the through hole and is cooperatively coupled with the adjusting nut 15 disposed inside the connecting bracket 14. The adjusting nut 15 is movable along a thread on the threaded section, and is thus able to drive the connecting bracket 14 to move on the bent rod 13.

Since the connecting bracket 14 is fixed on the end face 12, the adjusting nut 15 is cooperatively coupled with the bent rod 13, and the adjusting nut 15 is located inside the connecting bracket 14 and is able to drive the connecting bracket 14 to move on the bending rod 13, the bending angle of the elbow body 11 may be changed by adjusting a position of the adjusting nut 15 on the bent rod 13 to lengthen or compress the elbow body 11.

In embodiments of the present disclosure, two ends of the bent rod 13 may both be connected to the two end faces 12 by the adjusting assemblies 50; or, only one end of the bent rod 13 is connected to one end face 12 by the adjusting assembly 50, and another end of the bent rod 13 is directly fixed to another end face 12, which is not limited by embodiments of the present disclosure. In some embodiments of the present disclosure, two ends of the bent rod 13 are both connected to the two end faces 12 by the adjusting assemblies 50, so that the bent rod 13 may be adjusted at both ends at the same time, thereby improving an adjustment precision of the bending angle of the elbow.

The elbows in embodiments of the present disclosure are applicable to a variety of different initial bending angles. Taking the elbow in FIG. 1 as an example, the initial bending angle is 90°, and generally, an adjustable range of the bending angle is 75°~105°. In embodiments of the present disclosure, a purpose of adjusting the bending angle of the elbow is achieved by adjusting the adjusting nut 15. Elbows with different initial bending angles, plus existing standard elbows, enable precise deflection at any angle in the pipe layout.

As shown in FIG. 7, embodiments of the present disclosure further provide a pipe. The pipe includes two pipes sections to be connected 21, which are connected by the elbow as described above.

The foregoing descriptions are merely some specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

The present disclosure may also provide additional embodiments, which may include any of the above embodiments, and one or more of components, functions, or structures in the additional embodiments may be replaced or supplemented by one or more of components, functions, or structures in various embodiments described above.

What is claimed is:

1. An elbow, comprising:
   an elbow body, a pipe wall of the elbow body being saw-toothed along an extending direction of the elbow body so that a bending angle of the elbow body is adjustable;
   two end faces which are annular and are disposed respectively at two ends of the pipe wall of the elbow body; the two end faces being perpendicular to the extending direction of the elbow body; and the two end faces being connected to pipe sections to be connected;
   an angle adjusting mechanism disposed between the two end faces, and two ends of the angle adjusting mechanism being respectively connected to the two end faces;
   wherein,
   the angle adjusting mechanism is used for adjusting the bending angle of the elbow body;

the angle adjusting mechanism comprises a bent rod and at least one adjusting assembly; wherein two ends of the bent rod are respectively connected to the two end faces, and at least one end of the bent rod is connected to at least one of the two end faces by the at least one adjusting assembly;

the adjusting assembly comprises a connecting bracket fixed to a corresponding one of the two end faces, and a threaded section and an adjusting nut on the bent rod;

the connecting bracket is provided with a through hole on a surface thereof away from the corresponding one of the two end faces; at least a portion of the threaded section of the bent rod passes through the through hole and is cooperatively coupled with the adjusting nut disposed inside the connecting bracket; and the adjusting nut is movable along a thread on the threaded section, and is thus able to drive the connecting bracket to move on the bent rod.

2. The elbow according to claim 1, wherein the two ends of the bent rod are respectively connected to the two end faces by the adjusting assemblies.

3. The elbow according to claim 1, wherein an angle between adjacent saw teeth on the pipe wall of the elbow body is 10°~15°.

4. The elbow according to claim 1, wherein the bending angle of the elbow body is 75°~105°.

5. The elbow according to claim 1, wherein the elbow body is made of stainless steel.

6. The elbow according to claim 1, wherein the elbow body is integrally formed with the end faces.

7. The elbow according to claim 1, wherein the end faces are provided with a plurality of connecting holes, and the connecting holes are to be connected to fixing holes of the pipe sections to be connected by bolts.

8. A pipe, comprising two pipe sections to be connected, wherein the two pipe sections to be connected are connected by the elbow according to claim 1.

* * * * *